United States Patent
Shimahara

(10) Patent No.: US 11,828,626 B2
(45) Date of Patent: Nov. 28, 2023

(54) RESOLVER

(71) Applicants: Shiro Shimahara, Ueda (JP); Futaba Corporation, Mobara (JP)

(72) Inventor: Shiro Shimahara, Ueda (JP)

(73) Assignees: Shiro Shimahara, Ueda (JP); FUTABA CORPORATION, Mobara (JP)

( * ) Notice: Subject to any disclaimer, the term of this patent is extended or adjusted under 35 U.S.C. 154(b) by 22 days.

(21) Appl. No.: 17/636,280

(22) PCT Filed: May 8, 2020

(86) PCT No.: PCT/JP2020/018642
§ 371 (c)(1),
(2) Date: Feb. 17, 2022

(87) PCT Pub. No.: WO2021/038967
PCT Pub. Date: Mar. 4, 2021

(65) Prior Publication Data
US 2022/0291022 A1  Sep. 15, 2022

(30) Foreign Application Priority Data
Aug. 26, 2019  (JP) ................. 2019-153554

(51) Int. Cl.
*G01D 5/20* (2006.01)
(52) U.S. Cl.
CPC ..................... *G01D 5/20* (2013.01)
(58) Field of Classification Search
CPC ................... G01D 5/20; G01D 5/204
See application file for complete search history.

(56) References Cited

U.S. PATENT DOCUMENTS

| 6,011,389 | A | 1/2000 | Masreliez et al. |
| 6,239,571 | B1 | 5/2001 | Shimahara |
| 2006/0125588 | A1* | 6/2006 | Miya ............ G01D 5/2086 336/120 |
| 2010/0117631 | A1 | 5/2010 | Inoue et al. |
| 2010/0321007 | A1* | 12/2010 | Fukuda ......... G01D 5/2093 324/207.25 |

FOREIGN PATENT DOCUMENTS

| JP | 8-313295 A | 11/1996 |
| JP | 2000-292205 A | 10/2000 |
| JP | 2010-122040 A | 6/2010 |
| JP | 2017-90431 A | 5/2017 |
| WO | WO-03038379 A1 * | 5/2003 ........... D06F 39/003 |

OTHER PUBLICATIONS

International Search Report (PCT/ISA/210) issued in PCT/JP2020/018642 dated Aug. 11, 2020.

\* cited by examiner

*Primary Examiner* — Akm Zakaria
(74) *Attorney, Agent, or Firm* — Birch, Stewart, Kolasch & Birch, LLP

(57) ABSTRACT

Sheet coils formed in a ring shape to constitute excitation windings and detection winding, and magnetic cores attached to the sheet coils are provided with coil portions of the same coil pattern constituted by a multipole type on the front and back surfaces of sheet coils constituting at least one winding of the excitation windings and detection winding, and the electrical phase of one coil portion in each coil portion is made 180° different from the electrical phase of the other coil portion.

12 Claims, 7 Drawing Sheets

RESOLVER

TECHNICAL FIELD

The present invention relates to a resolver, including an excitation winding and a detection winding, suitable for detecting displacement amounts such as the rotation angle of a passive body.

BACKGROUND ART

Conventionally, resolvers are known to have two-phase excitation windings in which excitation signals are input while being fixed at a spatial position where the phases are different by 90° in terms of electrical angle, and a detection winding in which a detection signal provided on a rotational shaft is output, wherein the rotation angle of the rotational shaft is detected from the phase difference between the excitation signals and the detection signal. In this type of resolver, when the rotation angle of the rotational shaft is $\Phi$, one phase of the excitation winding becomes sin $\Phi$, and the other phase becomes cos $\Phi$. When excitation signals V·sin ωt and V·cos ωt having phases different by 90° are respectively given to the excitation winding, the detection signal output from the detection winding becomes E=V·sin ωt·cos $\Phi$+V·cos ωt·sin $\Phi$=V·sin (ωt+$\Phi$), and in order to obtain a detection signal whose phase changes in accordance with the rotation angle of the rotational shaft, the rotation angle 1 of the rotational shaft can be obtained from the phase difference between the excitation signal and the detection signal.

On the other hand, the present applicant has already proposed, in Patent Document 1, a resolver capable of realizing higher detection accuracy by using a modulation signal. At the same time, the resolver can be smaller, weigh less, and cost less. The resolver comprises an excitation winding to which an excitation signal is input and a detection winding from which a detection signal is output, and detects the displacement amount of the passive body based on the detection signal, which changes in accordance with the displacement amount of the passive body provided with the excitation winding or the detection winding, wherein a modulation signal obtained by modulating a high-frequency signal by the excitation signal is input to the excitation winding, and a detection signal is obtained by demodulating the modulation signal output from the detection winding.

PRIOR ART PUBLICATIONS

Patent Publications

Patent Document 1: Japanese Unexamined Patent Application Publication No. 2000-292205

DISCLOSURE OF THE INVENTION

Problem Solved by the Invention

However, the resolver described in the above-mentioned Patent Document 1 has the following problems to be further improved from the viewpoint of miniaturization, particularly micro-miniaturization.

That is, since this type of resolver uses a coil, a necessary inductance can be secured if the coil is large enough. But to realize a small resolver, particularly a micro-resolver having a diameter of approximately 5 mm, the inductance is reduced, and a necessary inductance cannot be secured. Therefore, it is necessary to further increase the drive frequency of the excitation current in order to compensate for this, but when the drive frequency is increased, other adverse effects occur, such as an increase in magnetic leakage flux. In addition, reducing the size of the resolver, i.e., miniaturizing and micro-miniaturizing the resolver requires removing the dead space inside the resolver as much as possible so that the resolver becomes easily affected by noise due to disturbances, or the like, causing the problem of lowering the detection accuracy.

After all, there was a limit to achieving miniaturization (micro-miniaturization) of the resolver while securing sufficient detection accuracy, stability, and reliability by ensuring the necessary inductance and eliminating the noise component due to the excess magnetic flux, including leakage flux and disturbance.

The present invention aims to provide a resolver that solves such problems existing in the background art.

Means for Solving the Problem

To solve the above-mentioned problems, provided is a resolver 1 for detecting the displacement amount of a passive body 4 provided with excitation windings $2x$ and $2y$ or a detection winding 3 based on a detection signal So which the detection winding 3 outputs with excitation signals Sx and Sy input to the excitation windings $2x$ and $2y$. The sheet coils Cx, Cy, and Co formed in a ring shape constituting the excitation windings $2x$ and $2y$, and the detection winding 3 and the magnetic cores 5 and 6 attached to the sheet coils Cx, Cy, and Co are provided. coil portions Mf, Mr . . . by the same coil patterns Pc . . . , respectively constituted in a multipolar form are provided on the front and back surfaces of sheet coils Cx . . . constituting at least one winding $2x$ ($2y$ and $2o$) of excitation windings $2x$ and $2y$ and the detection winding 3. The electrical phase of one coil portion Mf . . . in each coil portion Mf, Mr . . . is made different from the electrical phase of the other coil portion Mr . . . by 180°.

In this case, according to the preferred embodiment of the invention, the coil pattern Pc . . . can be formed in a rectangular wave-shape along the circumferential direction Df by combining wire portions in the circumferential direction Df (circumferential wire portions) Wo . . . , Wi . . . , and wire portions in the radial direction (radial wire portions) Wm . . . . In this case, it is desirable to set the coil patterns Pc . . . so that the widths Lo and Li of the circumferential wire portions Wo . . . , Wi . . . are larger than the width Lm of the radial wire portions Wm . . . On the other hand, the sheet coil Cx . . . is provided with an opening portion Hm . . . between the radial wire portions Wm . . . of the coil pattern Pc . . . , and can accommodate the sheet portion (sheet bridge portion) Cm . . . between the opening portions Hm . . . (6) in the sheet-storing groove portion $5h$ ($6h$) . . . provided on the core surface $5s$ ($6s$) of magnetic cores 5(6) . . . . In addition, it is desirable to provide the excitation windings $2x$ and $2y$ with modulation signals Smx and Smy in which the excitation signals Sx and Sy are amplitude-modulated by the high-frequency signal Sh and the polarity of the high-frequency signal Sh is inverted at the polarity inversion positions of the excitation signals Sx and Sy are used, demodulate the modulation signal Smo output from the detection winding 3 and obtain the detection signal So. Furthermore, it is possible to provide a magnetic flux correction function unit Fa whose electrical phase of one coil portion Mf . . . is different from the electrical phase of the other coil portion Mrs . . . by the electrical angle ε[°] that cancels the harmonic component of the magnetic flux distribution in at least one of the sheet coils Co . . . other than the sheet coil Cx . . . having the coil portions Mf, Mr . . . with 180[°] different phases in the sheet coils Cx, Cy, and Co . . . .

Effects of the Invention

Using resolver 1 of the present invention with such a configuration can achieve the following remarkable effects.

(1) Resolver 1 comprises sheet coils Cx, Cy, and Co formed in a ring shape constituting the excitation windings 2x and 2y, the detection winding 3, and magnetic cores 5 and 6 attached to the sheet coils Cx, Cy, and Co. The front and back surfaces of the sheet coils Cx . . . constituting at least one winding 2x (2y and 2o) of the excitation windings 2x and 2y, and the detection winding 3 comprises coil portions Mf and Mr which have the same coil pattern Pc . . . configured in multipole form, respectively. The electrical phase of one coil portion Mf . . . in each coil portion Mf, Mr . . . is different from the electrical phase of the other coil portion Mr . . . . by 180[°]. Thus, the noise component caused by excess magnetic flux, including leakage magnetic flux and external disturbance, can be canceled out by the generated magnetic flux in the opposite direction. As a result, downsizing (ultra-miniaturization) of the resolver 1 with the necessary inductance secures sufficient detection accuracy and stability and enhances the reliability.

(2) According to a preferred embodiment, forming the coil pattern Pc . . . in a rectangular wave-shape along the circumferential direction by combining circumferential wire portions Wo . . . , Wi in the circumferential direction Df and the radial wire portion Wm . . . in the radial direction can mutually align the wire portions Wm . . . in the radial direction constituting the coil pattern Pc . . . in the front and back surfaces of the sheet coils Cx . . . , which enables the implementation of an optimum form that ensures maximum noise immunity from the viewpoint of canceling noise components.

(3) According to the preferred embodiment, when forming the coil pattern Pc . . . , setting the widths Lo and Li of the circumferential wire portions Wo . . . and Wi . . . larger than the width Lm of the radial wire portions Wm . . . can reduce the electrical resistance of the whole coils patterns Pc . . . , increase the effective magnetic flux density generated to increase the detection efficiency of the resolver 1.

(4) According to the preferred embodiment, providing opening portions Hm . . . between the radial wire portions Wm, Wm . . . of the coil patterns Pc . . . in the sheet coils Cx . . . and accommodating the sheet bridge portions Cm . . . between the opening portions Hm . . . in the sheet-storing groove portions 5h (6h) . . . provided on the core surface 5s (6s) . . . of the magnetic core 5 (6) . . . can make the whole thickness when installing sheet coils Cx . . . to the magnetic cores 5 . . . thinner, further miniaturizes the resolver 1 (micro-miniaturization), and contribute to the further improvement of magnetic circuit characteristics due to reduction of magnetic leakage flux. Furthermore, in addition to contributing to the weight reduction of the resolver 1 as a whole, it can also facilitate the assembly (manufacturing ease), such as easy positioning between the sheet coils Cx . . . and the magnetic cores 5 . . . .

(5) According to the preferred embodiment, inputting modulation signals Smx and Smy in which the excitation signals Sx and Sy are amplitude-modulated by the high-frequency signal Sh and the polarity of the high-frequency signal Sh is inverted at the polarity inversion positions of the excitation signals Sx and Sy to the excitation windings 2x and 2y and demodulating the modulation signal Smo output from the detection winding 3 to obtain the detection signal So can yield sufficient induced voltage (detection signal So) even when the number of poles (pole pair number) of the sheet coils Cx . . . , Cy . . . , Co . . . is set to be small, which can contribute to micro-miniaturization, weight reduction, and cost reduction of the resolver 1, and can also contribute to further improvement of detection accuracy by simplifying and stabilizing the signal processing after demodulation processing.

(6) According to the preferred embodiment, when constituting at least one of sheet coils Co . . . other than sheet coils Cx . . . having coil portions Mf and Mr . . . whose phases are made different by 180° in sheet coils Cx, Cy, and Co, providing magnetic flux correction function unit Fa in which the electrical phase of one coil portion Mf . . . is different from the electrical phase of the other coil portion Mr . . . by an electrical angle ε[°] for canceling a harmonic component of the magnetic flux distribution can add the correction function for the magnetic flux to the original detection function (excitation function), and in particular, reduce the detection error due to the harmonic component, and further improve the detection accuracy.

DESCRIPTION OF REFERENCE NUMERALS

1: resolver, 2x: excitation winding, 2y: excitation winding, 3: detection winding, 4: passive body, 5: magnetic core, 5s: core surface, 5h: sheet-storing groove, 6: magnetic core, 6s: core surface, 6h: sheet-storing groove, Sx: excitation signal, Sy: excitation signal, So: detection signal, Sh: high-frequency signal, Smx: modulation signal, Smy: modulation signal, Smo: modulation signal, Cx: sheet coil, Cy: sheet coil, Co: sheet coil, Cm: sheet bridge portion, Pc: coil pattern, Mf: coil portion (first coil portion), Mr: coil portion (second coil portion), Df: circumferential direction, Wo: wire portion (circumferential wire portion), Wi: wire portion (circumferential wire portion), Wm: wire portion (radial wire portion), Lo: width of circumferential wire portion, Li: width of the circumferential wire portion, Lm: width of the radial wire portion, Hm: opening portion, Fa: magnetic flux correction function unit

BEST MODE FOR CARRYING OUT THE INVENTION

Next, Examples 1 and 2 of the preferred embodiments of the present invention will be listed and described in detail based on the drawings.

First Embodiment

First, the configuration of resolver 1 of Example 1 of the present invention will be described with reference to FIGS. 1 to 8.

Figure 7:
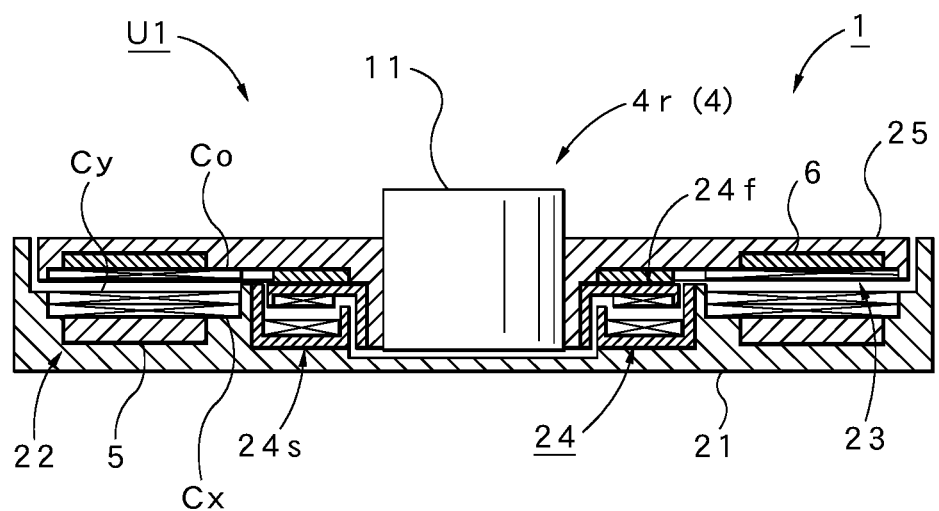
FIG. 7 is a side sectional view showing the internal structure of the resolver main body of the same resolver.
Figure 8:
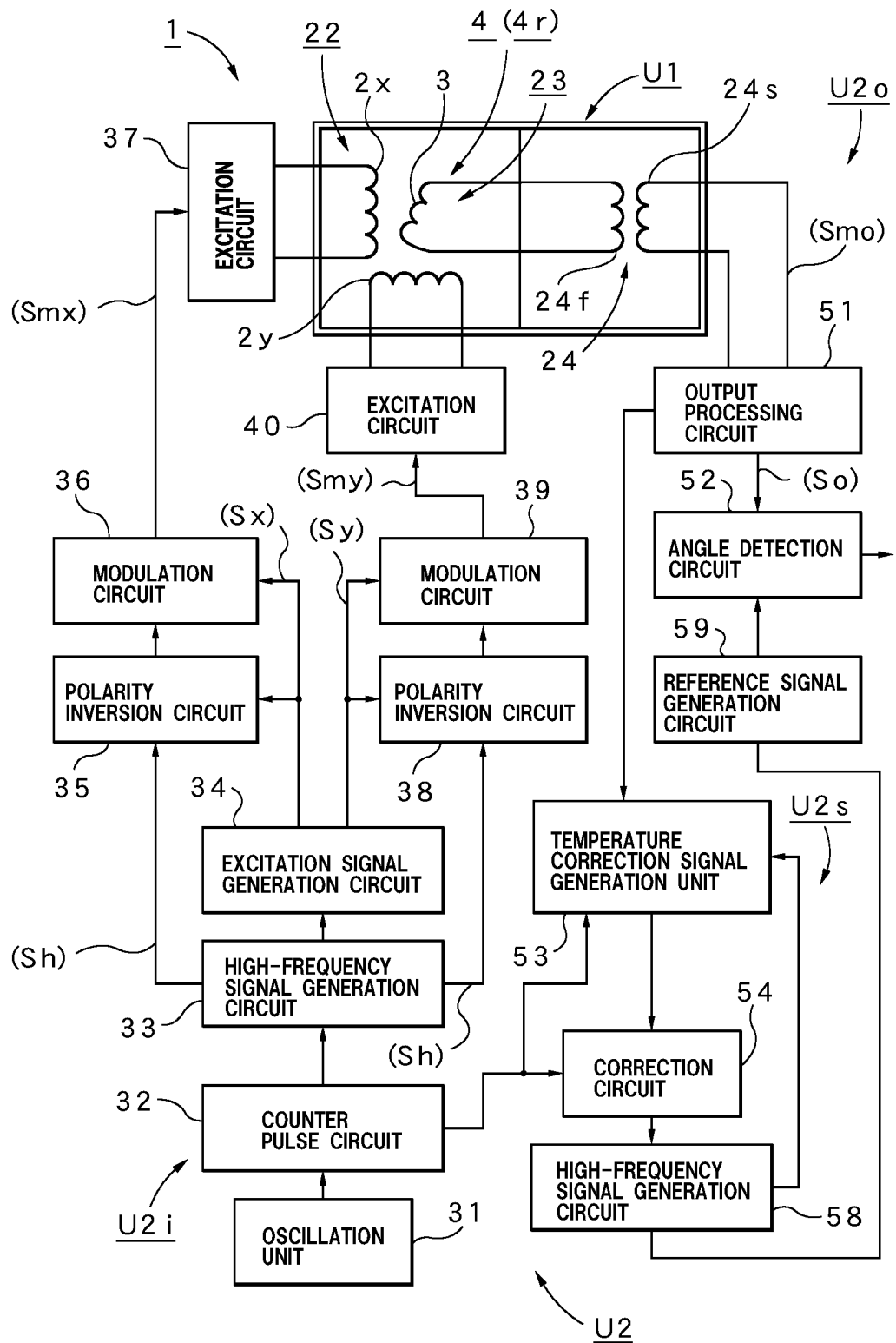
FIG. 8 is a block circuit diagram of the signal processing unit of the resolver.

The resolver 1 according to Example 1 has, roughly speaking, a resolver main body U1 composed of a magnetic system and a mechanical system as shown in FIG. 7, and a signal processing unit U2 composed of an electrical system, as shown in FIG. 8.

As shown in FIG. 7, the resolver main body U1 comprises an excitation unit 22 that is fixedly mounted inside a casing 21, and a rotating body 4r (passive body 4) having a rotational shaft 11 that is supported rotatably in the center of the casing 21. The rotating body 4r is provided with a disk portion 25, having the rotational shaft 11 fixed at the center position. The detection unit 23 facing the excitation unit 22 is attached to the surface of the disk portion 25 facing the excitation unit 22. The excitation unit 22 is entirely ring-shaped, and the secondary winding 24s of the output transformer 24 is arranged in the inner space of the excitation unit 22. The detection unit 23 is also entirely ring-shaped. The disk portion 25 inside the detection unit 23 has the primary winding 24f of the output transformer 24 facing the secondary winding 24s. The above is the basic configuration of the entire resolver main body U1.

Next, the configuration of the main part of the resolver 1 according to Example 1, that is, the configuration of the excitation unit 22 and the detection unit 23 provided in the main part U1 of the resolver, will be described in detail.

Figure 1:
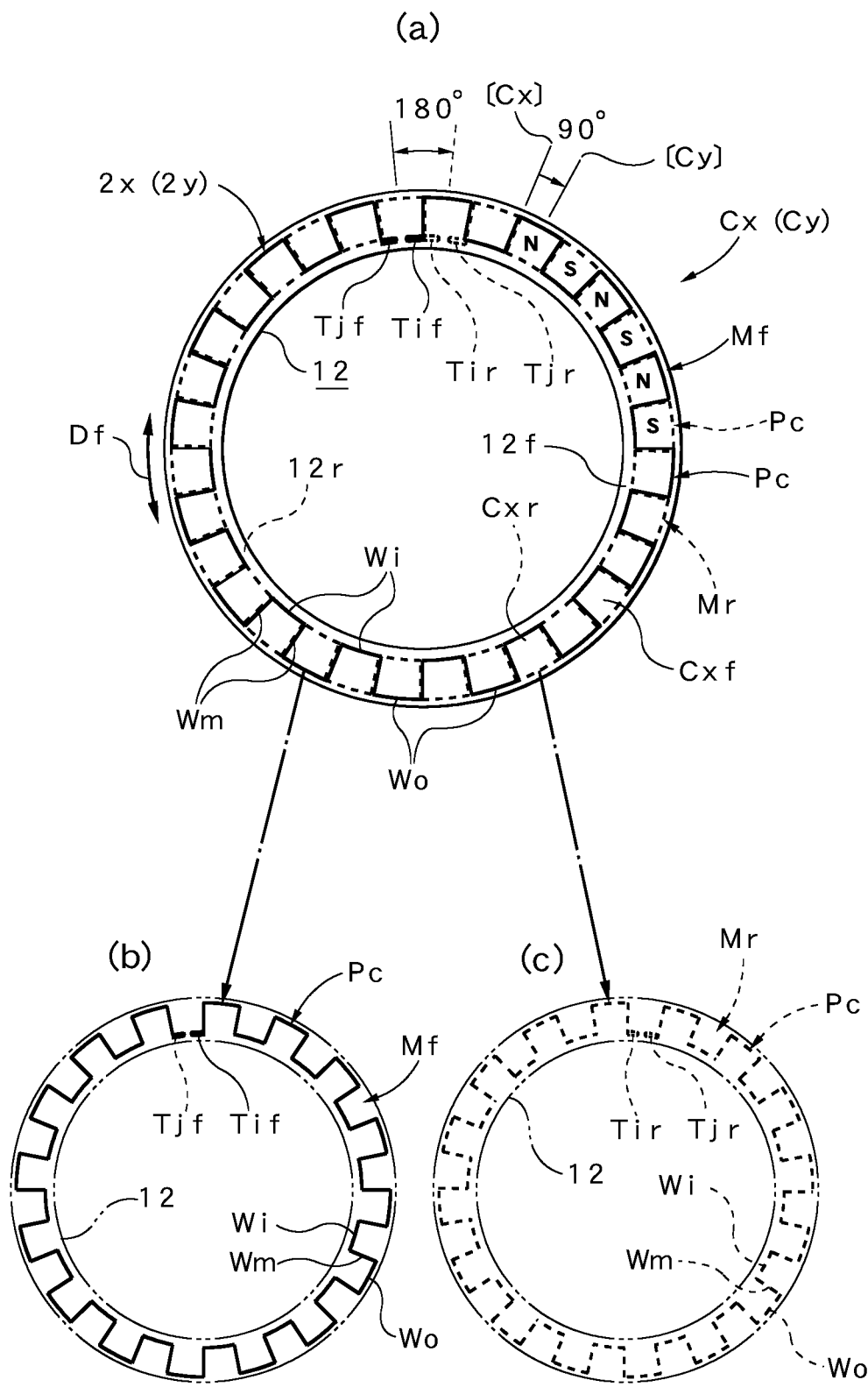
FIG. 1 is a plan view of the sheet coil used in the resolver of Example 1 of the present invention.
Figure 2:
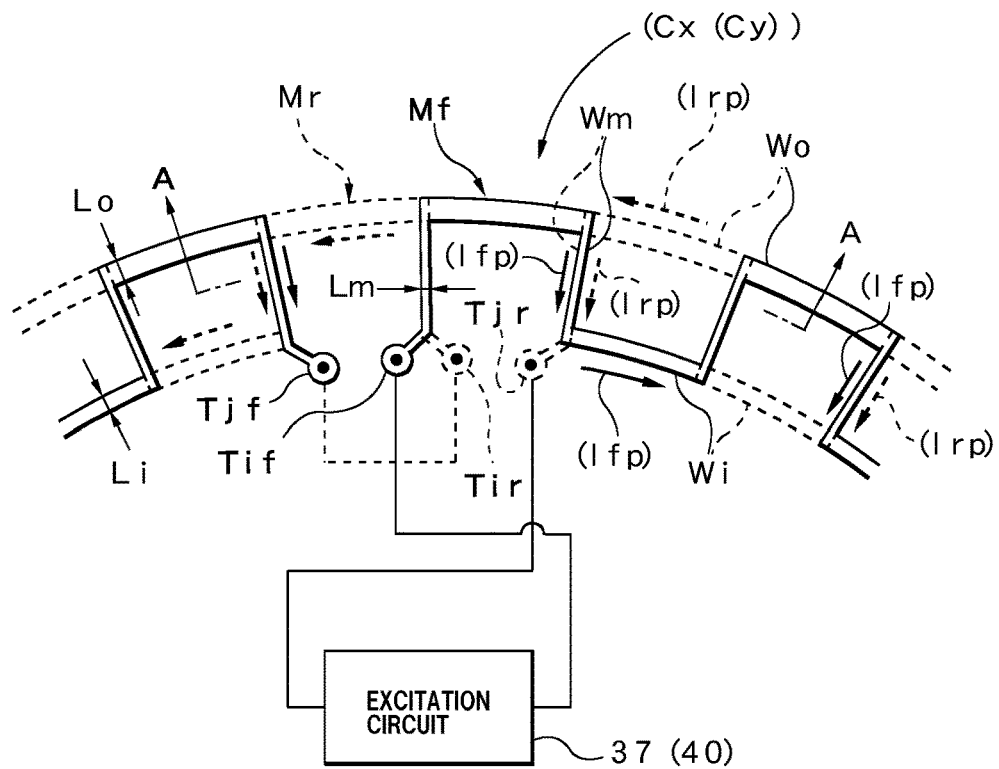
FIG. 2 is an enlarged view of the sheet coil used in the resolver.
Figure 3:
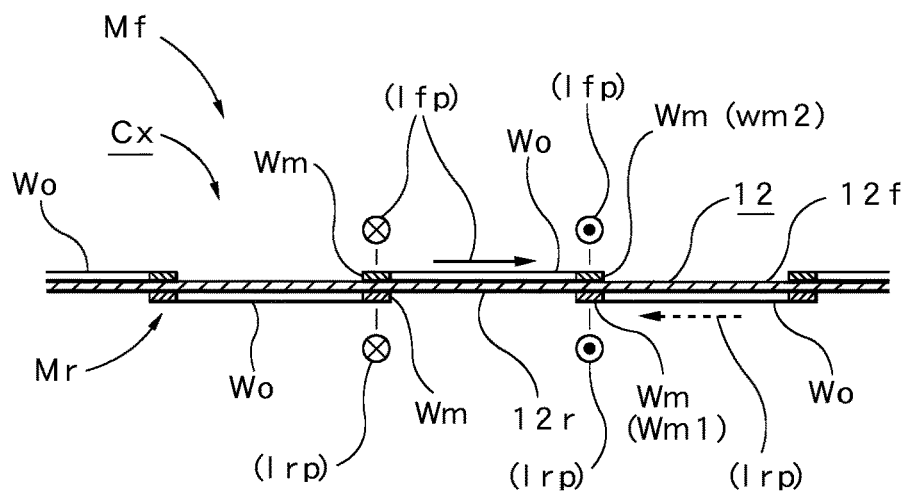
FIG. 3 is a cross-sectional view of the A-A line in FIG. 2

FIGS. 1 to 3 show a single sheet coil Cx used in the excitation unit 22. The excitation unit 22 can be configured by preparing two of these sheet coils Cx and combining them with the magnetic core 29 (5) shown in FIG. 5. That is, as shown in FIG. 8, the excitation unit 22 is provided with a sin phase side excitation winding 2x to which a modulated excitation signal Sx is applied, and a cos phase side excitation winding 2y to which a modulated excitation signal Sy is applied. Two identical sheet coils Cx . . . are prepared and one sheet coil Cx is used as the excitation winding 2y on the sin phase side, and the other sheet coil Cx can be used as the excitation winding 2y on the cos phase side by overlapping them with a different phase by 90°.

Next, the configuration of the sheet coil Cx is described specifically. As shown in FIGS. 1 to 3, the sheet coil Cx forms a sheet portion 12 formed with an insulating substrate in a ring shape, the first coil portion Mf shown in FIG. 1(b) formed by a conductor (copper foil) on the surface (one face) of the sheet portion 12, and a second coil portion Mr shown in FIG. 1(c) by a conductor (copper foil) on the back surface (the other face) of the sheet portion 12. The entire sheet coil is configured as a flexible print circuit board (FPCB).

The first coil portion Mf and the second coil portion Mr are respectively formed by the same coil pattern Pc . . . , respectively configured in a multipolar form. FIG. 1 shows a case in which the pole-pair number is set to "16". In the example, the thickness of the sheet portion 12 is 0.02 [mm], and the thickness of the coil portions Mf and Mr is 0.015 [mm]. In the example, the case where the pole-pair number is selected to be "16" is shown, but this pole-pair number is arbitrary. At present, a pole-pair number of "2" to "512" can be assumed, but in the future, practical application of a higher pole-pair number is assumed.

As shown in FIGS. 2 and 3, the coil pattern Pc combines the wire portions Wo and Wi in the circumferential direction Df and the wire portion Wm in the radial direction on the front and back surfaces of the sheet coil Cx, forming in a rectangular waveform along the circumferential direction Df. At this time, the coil pattern Pc sets the widths Lo and Li of the circumferential wire portions Wo and Wi to be larger than the width Lm of the radial wire portion Wm. Specifically, it is desirable to select the widths Lo and Li of the circumferential wire portions Wo . . . and Wi . . . to be 1.5 to 3.5 times the width dimension Lm of the radial wire portion Wm . . . .

As described above, when the coil patterns Pc are formed in a rectangular wave shape along the circumferential direction Df by combining the circumferential wire portions Wo and Wi in the circumferential direction Df and the radial wire portions Wm in the radial direction, the radial wire portions Wm constituting the coil patterns Pc can be radially aligned with each other on the front and back surfaces of the sheet coils Cx. Thus, an optimum form can be implemented ensuring the maximum immunity from the viewpoint of cancelling the noise component. Particularly, if the widths Lo and Li of the circumferential wire portions Wo and Wi are set larger than the width Lm of the radial wire portions Wm, the electric resistance of the entire coil pattern Pc can be reduced so that the generated effective magnetic flux density can be increased to enhance the detection efficiency of the resolver 1.

As shown in FIG. 2, the first coil portion Mf and the second coil portion Mr are arranged such that the phase of the electrical angle of the second coil portion Mr is different from that of the first coil portion Mf by 180°, whereby the first radial wire portion Wm (Wm1) of the second coil portion Mr on the back surface 12r overlaps the second radial wire portion Wm (Wm2) of the first coil portion Mf on the front face 12f in parallel via the sheet portion 12 at the same position in the circumferential direction Df.

Since this constitutes one sheet coil Cx, as described above, two identical sheet coils Cx and Cx can be prepared, one of which can be used as the sheet coil Cx and the other as the sheet coil Cy.

Figure 4:
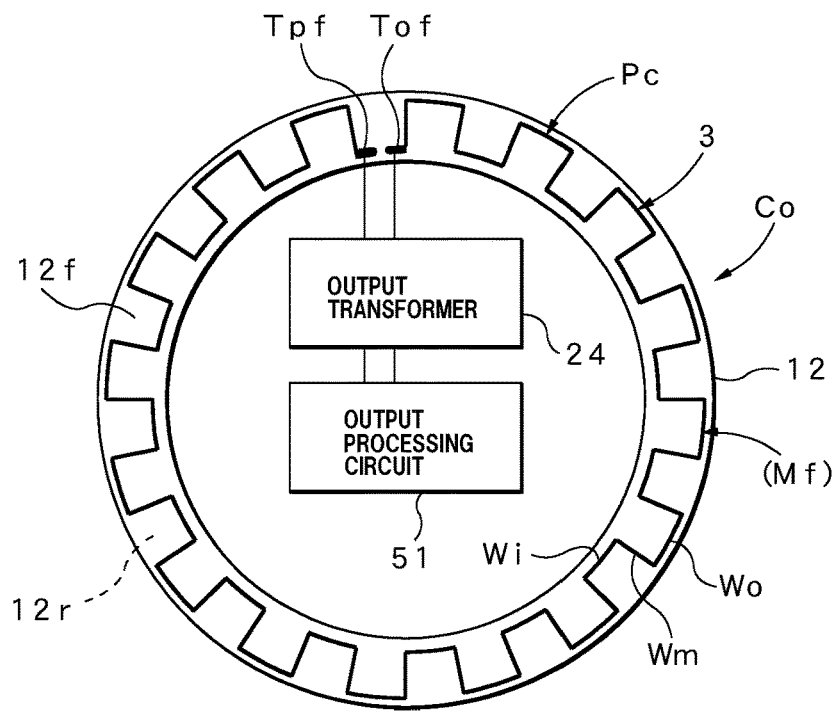
FIG. 4 is a plan view of the sheet coil used for the detection winding in the resolver.
Figure 5:
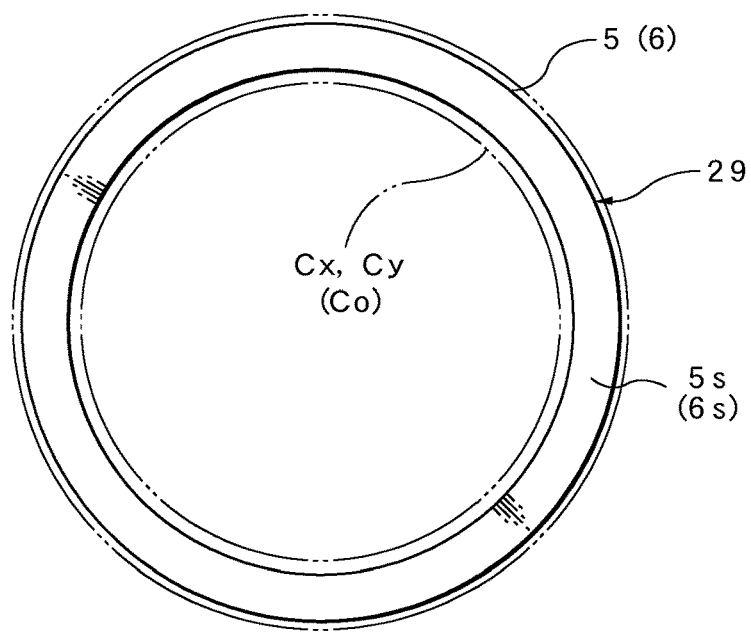
FIG. 5 is a plan view of the magnetic core used in the resolver.

The detection unit 23 can be composed of the sheet coil Co shown in FIG. 4 and the magnetic core 29(6) shown in FIG. 5 shown in FIG. 5 and can be assembled as shown in FIG. 7. The same sheet coil as the sheet coil Cx described above can be used as the sheet coil Co in the detection unit 23. However, the sheet coil Co shown in FIG. 4 in the example is a sheet coil in which the coil portion Mf with the coil pattern Pc is provided only on the surface (one side) 12f of the sheet portion 12 to configure the detection winding 3. Accordingly, sheet coil Co shown in FIG. 4, can be configured in the same manner as the sheet coil Cx described above, except that the coil pattern Pc is not provided on the back surface (the other side) 12r of the sheet portion 12.

Figure 6:
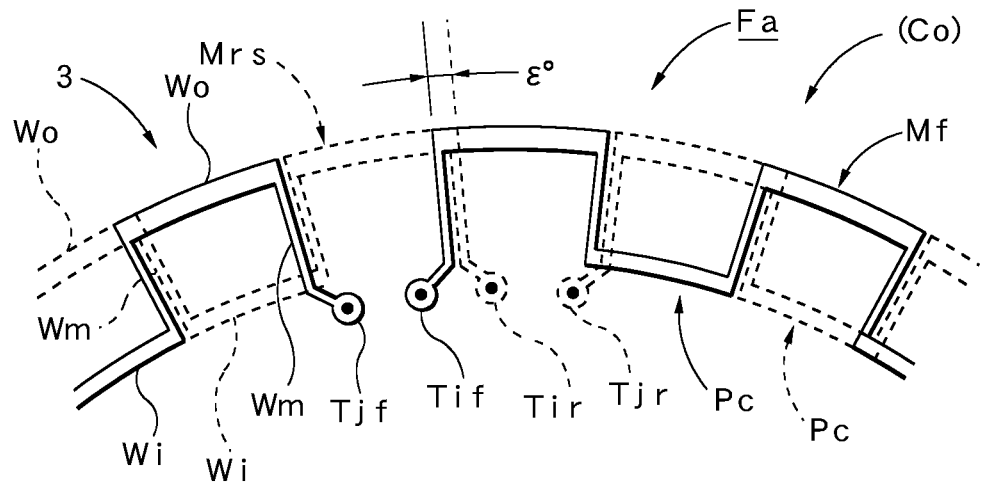
FIG. 6 is an enlarged view of the sheet coil used in the resolver.

On the other hand, FIG. 6 shows a modified example of the sheet coil Co. That is, when at least one of the sheet coils Cx, Cy, or Co other than the sheet coil Cx having the coil portions Mf and Mr different in phase by 180° is configured, the magnetic flux correction function unit Fa is provided in which the electrical phase of one coil portion Mf . . . is different from the electrical phase of the other coil portion Mr . . . by the electrical angle c° for canceling the harmonic component of the magnetic flux distribution. Therefore, in the case of the example, the sheet coil Co is a target to which the modification can be applied.

In the case of the sheet coil Co . . . , the magnetic flux distribution generated by the coil portion Mf usually includes many harmonic components, affecting the detection error. For this reason, a coil portion Mf is provided on the surface 12f of the sheet portion 12, and an additional coil portion Mrs is provided on the back surface 12r of the sheet portion 12. By displacing this coil portion Mrs and the coil portion Mf of the surface 12f, it is made to function as a magnetic flux correction function unit Fa to cancel out the unwanted harmonic components. In this case, by selecting the magnitude of the predetermined electrical angle ε[°], the frequency of the harmonic component to be canceled can be selected. For example, to reduce the third-order harmonic component, ε[°] can be selected to be 60[°]. Also, for example, a sheet coil with a coil portion selected to be 2×ε[°] can be made and added to the sheet coil Co selected to be ε[°], so that two different harmonic components can be reduced simultaneously, and so on. One or two or more sheet coils can be added as needed. If such a magnetic flux correction function unit Fa is provided, a correction function for magnetic flux can be added to the original detection function (excitation function), which has the advantage of reducing the detection error due to harmonic components and contributing to further improvement of the detection accuracy.

On the other hand, for the magnetic cores 5 and 6, the two magnetic cores 29 shown in FIG. 5 are prepared. The one magnetic core 29 is used as the magnetic core 5 comprising the excitation windings 2x and 2y. The other magnetic core 29 is used as the magnetic core 6, comprising the detection winding 3. This magnetic core 29 is formed in the shape of a ring with a predetermined thickness integrally molded by a magnetic material such as ferrite. The core surface 5s (6s) in the magnetic core 29 (5 and 6) to which the sheet coils Cx and Cy (Co) are attached is formed into a flat surface.

When assembling the sheet coils Cx, Cy, and Co, and the magnetic cores 5 and 6 in this manner, the first step is to assemble (attach) one of the sheet coils Cx (excitation winding) to the core surface 5s of the magnetic core 5. After this, as shown in FIG. 1(a), the other sheet coil Cy (excitation winding 2y) is assembled (attached) by changing the phase 90° spatially at the electrical angle. In the same way, the sheet coil Co (excitation winding 2o) is assembled (attached) to the core surface 6s of the magnetic core 6. Since the excitation unit 22 and the detection unit 23 are thus obtained, as shown in FIG. 7, the excitation unit 22 is assembled to the casing 21, and the detection unit 23 is attached to the disk portion 25 and further assembled to the casing 21.

Next, the configuration of the signal processing unit U2 used in connection with the resolver main body U1 configured in this manner will be described, with reference to FIG. 8.

In FIG. 8, U1 denotes the resolver main body. To clarify the configuration, the same reference numerals denote the same components as FIGS. 1 to 7. The signal processing unit U2 connected to the resolver main body U1 includes an input-side circuit U2i. The input-side circuit U2i comprises counter pulse circuit 32 for generating a counter pulse based on a clock signal generated by an oscillator 31; a high-frequency signal generation circuit 33 for generating a high-frequency signal having a frequency of about 1 MHz based on the counter pulse; an excitation signal generation circuit 34 for generating excitation signals Sx (V·sin ωt) and Sy (V·cos ωt) based on the counter pulse; a polarity inversion circuit 35 with the input of one excitation signal Sx, inverting the polarity of the high-frequency signal at the polarity inversion position of the excitation signal Sx and outputting; a modulation circuit 36 for amplitude-modulating the excitation signal Sx based on the high-frequency signal output from the polarity inversion circuit 35; and an excitation circuit 37 for supplying the modulation signal Smy output from the modulation circuit 39, i.e., the amplitude-modulated excitation signal Sy to the other excitation winding 2x. The input-side circuit U2i also comprises polarity inversion circuit 38 with the input of the other excitation signal Sy, for inverting the polarity of the high-frequency signal at the polarity inversion position of the excitation signal Sy; a modulation circuit 39 for amplitude-modulating the excitation signal Sy based on the high-frequency signal output from the polarity inversion circuit 38; and an excitation circuit 40 for supplying the modulation signal Smy output from the modulation circuit 39, i.e., the amplitude-modulated excitation signal Sy, to the other excitation winding 2y.

In this case, since the excitation winding 2x is composed of a sheet coil Cx, as shown in FIG. 2, the first coil portion Mf and the second coil portion Mr are connected in series. The input terminal Tjf on the other end side in the first coil portion Mf and the input terminal Tir on the first end side in the second coil portion Mr are connected. The input terminal Tif on the one end side in the first coil portion Mf and the input terminal Tjr on the other end side of the second coil portion Mr are respectively connected to the excitation circuit 37. Accordingly, the directions of current flow in the first coil portion Mf and the second coil portion Mr are opposite in the circumferential direction Df. Similarly, since the excitation winding 2y is also provided with a sheet coil Cy, it is connected in the same manner as the excitation winding 2x to the excitation circuit 40.

On the other hand, U2o is an output side circuit, and the output side circuit U2o comprises an output processing circuit 51 which is connected to the secondary winding 24s of the output transformer 24 to demodulate the modulation signal Smo output from the secondary winding 24s and output the detection signal So, and an angle detection circuit 52 to which the detection signal So obtained from the output processing circuit 51 is applied. The primary winding 24f of the output transformer 24 is connected to the detection winding 3. In the exemplary case, since the detection winding 3 is composed of the sheet coil Co, as shown in FIG. 4, the output terminal Tof on the one end side and the output terminal Tpf on the other end side of the sheet coil Co are connected to the primary winding 24f of the output transformer 24.

On the other hand, U2s is a phase correction circuit for correcting a phase error occurring between the excitation signals Sx, Sy, and the detection signal So, and the phase correction circuit U2s comprises a temperature correction signal generation unit 53 for generating a correction signal based on the temperature drift, a correction circuit 54 for correcting the counter pulse output from the counter pulse circuit 32 by the correction signal output from the temperature correction signal generation unit 53, a high-frequency signal generation circuit 58 for generating a high-frequency signal on the basis of the corrected counter pulse output from the correction circuit 54, and a reference signal generation circuit 59 for generating a reference signal on the basis of the high-frequency signal output from the high-frequency signal generation circuit 58, and the reference signal generated by the reference signal generation circuit 59 is applied to the angle detection circuit 52. Furthermore, the temperature correction signal generation unit 53 comprises a temperature drift detection function for detecting an error component due to the temperature drift of the high-frequency signal component on the basis of the high-frequency signal component obtained by separating the high-frequency signal component from the modulation signal Smo obtained via the output processing circuit 51, and on the basis of the obtained high-frequency signal component, the counter pulse output from the counter pulse circuit 32, and the high-frequency signal output from the high-frequency signal generation circuit 58, and a correction signal generation function for generating the above correction signal on the basis of the error component obtained from the temperature drift detection function.

As described above, if the amplitude modulation of the excitation signals Sx and Sy by the high-frequency signal Sh is applied to the excitation windings 2x and 2y, the modulation signals Smx and Smy in which the polarity of the high-frequency signal Sh is inverted at the polarity inversion position of the excitation signals Sx and Sy are input, and the modulation signal Smo output from the detection winding 3 is demodulated to obtain the detection signal So, a sufficient induced voltage (detection signal So) can be obtained even when the pole pair number of the sheet coils Cx . . . , Cy . . . , and Co . . . is set to be small, so that it is possible to contribute to the micro-miniaturization, weight reduction, and cost reduction of the resolver 1 as a result, and has the advantage of contributing to the higher precision of the detection accuracy by facilitating and stabilizing the signal processing after the demodulation processing.

Next, the operation of the resolver 1 according to Example 1 having such a configuration will be described with reference to the respective drawings.

First, a clock signal output from the oscillation unit 31 shown in FIG. 8 is applied to a counter pulse circuit 32 to generate a counter pulse. The counter pulse is applied to the input side of the high-frequency signal generation circuit 33, the temperature correction signal generation unit 53 and the correction circuit 54, respectively. The high-frequency signal generation circuit 33 generates a high-frequency signal having a frequency of about 1 [MHz] based on the counter pulse, and the high-frequency signal is applied to the input side of the excitation signal generation circuit 34 to generate excitation signals Sx and Sy.

Then, one of the excitation signals Sx is applied to the modulation circuit 36 and the polarity inversion circuit 35, respectively, and in the modulation circuit 36, the excitation signal Sx applied from the excitation signal generation circuit 34 is amplitude-modulated by a high-frequency signal applied from the polarity inversion circuit 35, and the modulation signal Smx thus obtained is applied to the excitation winding 2x via the excitation circuit 37. At this time, the polarity of the high-frequency signal is inverted at each polarity inversion position of the excitation signal Sx by the polarity inversion circuit 35. As a result, the excitation winding 2x is excited by the modulation signal Smx, and the high-frequency current caused by the modulation signal Smx flows through the excitation winding 2x.

At this time, as shown in FIG. 2, when, for example, a signal on the positive electrode side is added between the input terminals Tif and Tjr of the sheet coil Cx constituting the excitation winding 2x, a current Ifp indicated by a solid arrow, flows through the first coil portion Mf and a current Irp indicated by a dotted arrow flows through the second coil portion Mr.

As a result, as shown in FIG. 3, currents Ifp and Irp flow in the same direction in the radial wire portion Wm on the front side and the radial wire portion Wm in the back side at the same position in the radial direction of the sheet coil Cx, that is, in the circumferential direction Df, and in the radial direction of the back side of the sheet coil Cx. Thus, effective magnetic fluxes are generated by adding the magnetic fluxes generated by the radial wire portion Wm of the front side and the magnetic fluxes generated by the radial wire portion Wm of the back side. On the other hand, currents Ifp and Irp flow in opposite directions in the circumferential direction Df of the sheet coil Cx, that is, in the circumferential wire portion Wi (or Wo) of the first coil portion Mf and in the circumferential wire portion Wo (or Wi) of the second coil portion Mr. As a result, the magnetic fluxes generated by the current flowing in the circumferential wire portion Wi (or Wo) of the first coil portion Mf and the magnetic fluxes generated by the current flowing in the circumferential wire portion Wo (or Wi) of the second coil portion Mr cancel each other out. Since the magnetic fluxes generated by the circumferential wire portions Wi and Wo are essentially unnecessary, they cancel each other out, which reduces the magnetic fluxes that cause noise components.

The other excitation signal Sy is applied to the modulation circuit 39 and the polarity inversion circuit 38, respectively, and in the modulation circuit 39, the excitation signal Sy applied from the excitation signal generation circuit 34 is amplitude-modulated by a high-frequency signal applied from the polarity inversion circuit 38, and the modulation signal Smy obtained thereby is applied to the excitation winding 2y via the excitation circuit 40. At this time, the polarity of the high-frequency signal applied from the high-frequency signal generation circuit 33 by the polarity inversion circuit 38 is inverted for each polarity inversion position of the excitation signal Sy. As a result, the excitation winding 2y is excited by the modulation signal Smy, and a high-frequency current based on the modulation signal Smy flows through the excitation winding 2y.

In this case, the sheet coil Cy also has the same effect as that of the sheet coil Cx described above. That is, the magnetic fluxes generated by the radial wire portions Wm . . . mutually cancel each other out, which reduces the magnetic flux causing the noise component.

On the other hand, the voltage induced on the basis of the excitation signal Sx and the voltage induced on the basis of the excitation signal Sy are added from the detection winding 3, the added voltage is output as the modulation signal Smo, and a high-frequency current based on the modulation signal Smo flows. This modulation signal Smo is applied to the output processing circuit 51, and the modulation signal Smo is demodulated. As a result, the detection signal So is obtained and applied to the angle detection circuit 52. Further, in the output processing circuit 51, the high-frequency signal components are separated from the modulation signal Smo, and the separated high-frequency signal components are applied to the temperature correction signal generation unit 53 having the temperature drift detection function. Thus, in the temperature correction signal generation unit 53, the error components due to the temperature drift of the high-frequency signal components are detected on the basis of the high-frequency signal components separated by the high-frequency signal separation function, the counter pulses obtained from the counter pulse circuit 32, and the high-frequency signal obtained from the high-frequency signal generation circuit 58, and a correction signal is generated on the basis of the error components, and the correction signal is applied to the correction circuit 54. Then, in the correction circuit 54, the counter pulse applied from the counter pulse circuit 32 is corrected by the correction signal. That is, the error components due to the temperature drift are eliminated.

On the other hand, the corrected counter pulse obtained from the correction circuit 54 is applied to a high-frequency signal generation circuit 58, and a high-frequency signal is generated based on the counter pulse. The high-frequency signal obtained from the high-frequency signal generation circuit 58 is applied to a temperature correction signal generation unit 53, and a reference signal is generated based on the high-frequency signal in the reference signal generation function of the temperature correction signal generation unit 53. The reference signal is applied to an angle detection circuit 52, and the angle detection circuit 52 generates a reference pulse from the reference signal and a detection pulse from the detection signal So. Then, the counter pulse is counted between the rise of the reference pulse and the rise of the detection pulse, and the counted value is converted into an angle to obtain the rotation angle of the rotational shaft 11. Specifically, the relationship between the count value and the rotation angle may be stored in a database in advance, and the rotation angle corresponding to the count value may be read out from the database, or may be calculated by using a function formula set in advance.

Second Embodiment

Next, the configuration of resolver 1 according to Example 2 of the present invention will be described with reference to FIGS. 9 to 12.

Figure 10:
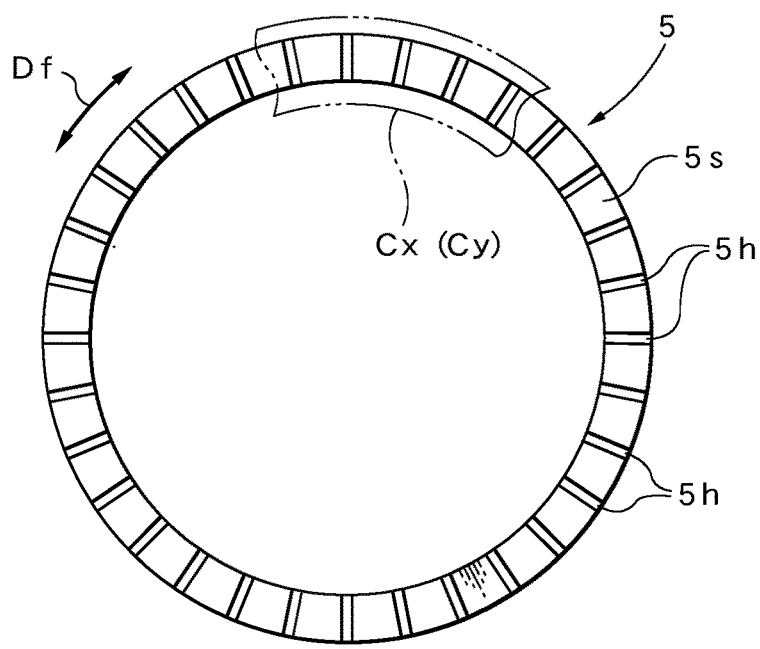
FIG. 10 is a plan view of the magnetic core used in the resolver.
Figure 11:
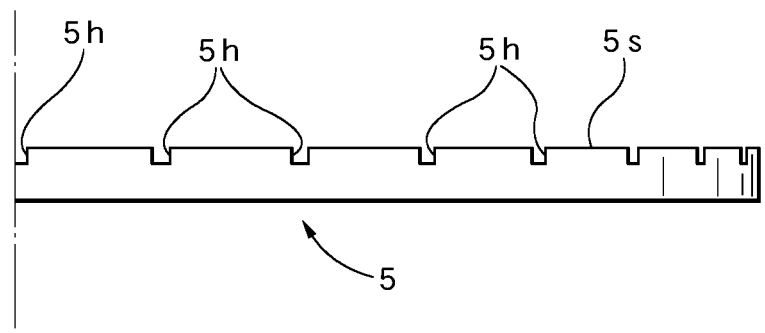
FIG. 11 is a side view of half of a magnetic core used in the same resolver.
Figure 12:
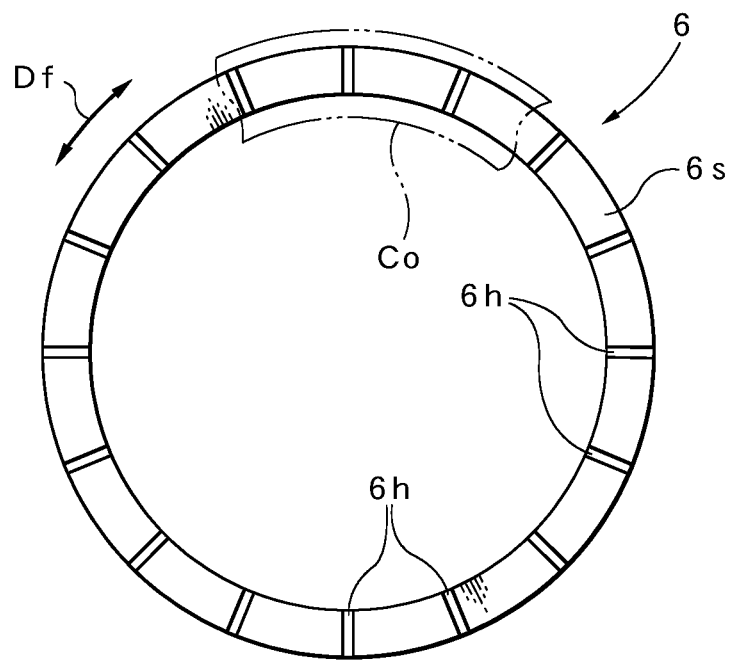
FIG. 12 is a plan view of the magnetic core used for the detection winding in the resolver.

The resolver 1 of Example 2 differs from that of Example 1 in that the pole pair number is set to "16" in Example 1, whereas the pole pair number is set to "8" in Example 2, and that the core surface 5s (6s) of the magnetic core 5 (6) of Example 2 is provided with a sheet-storing groove 5h . . . (6h . . . ) as shown in FIGS. 10 to 12, whereas the core surface 5s (6s) of the magnetic core 5 (6) of Example 2 is flat. Therefore, by providing an opening portion Hm . . . between the radial wire portions Wm, Wm . . . of the coil pattern Pc . . . in the sheet portion 12e constituting the sheet coil Cx (Cy and Co), a sheet bridge portion Cm . . . is provided between the opening portions Hm . . . so that the sheet bridge portion Cm . . . can be accommodated in the sheet-storing grooves 5h . . . .

In this case, since the magnetic core 5 to which the sheet coil Cx (Cy) is attached, as shown in FIG. 10 (FIG. 11), combines the sheet coil Cx constituting the excitation winding 2x on the sin phase side with the sheet coil Cy constituting the excitation winding 2y on the cos phase side having a 90[°] phase difference from that of the sheet coil Cx, the interval (quantity) between the sheet-storing groove portions 5h . . . is ½ times (twice) the interval (quantity) between the sheet bridge portions Cm . . . .

Figure 9:
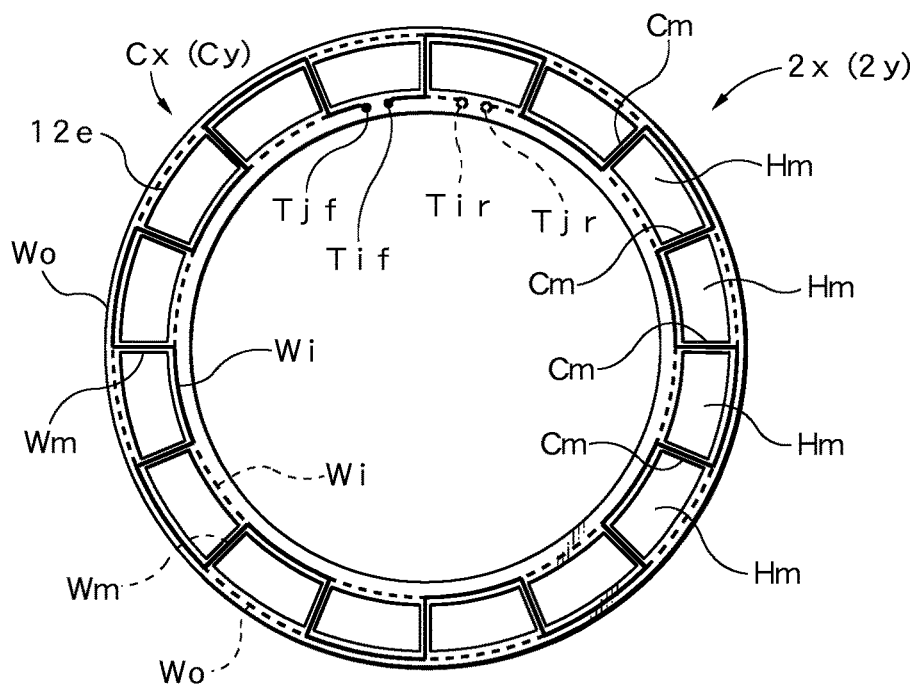
FIG. 9 is a plan view of the sheet coil used in the resolver of Example 2 of the present invention.

On the other hand, assuming that the coil pattern Pc is provided on only one surface of the magnetic core 6 to which the sheet coil Co is attached, as shown in FIG. 12, the interval (quantity) of the sheet-storing groove portions 6h is equal to the interval (quantity) of the sheet bridge portions Cm (see FIG. 9). As shown in FIG. 11, the sheet-storing groove portions 5h in the magnetic core 5 are formed in the same manner as in the magnetic core 5 except that the sheet-storing groove portions 5h . . . are formed in the radial direction of the core surface 5s, the cross-sectional shape is rectangular, and the shape of the magnetic core 6 is ½ times (twice) the interval (quantity) of the sheet-storing groove portions 5h . . . in the magnetic core 5.

Furthermore, the resolver 1 . . . according to Examples 1 and 2, are micro-resolvers having diameters of about 5 mm, so that the diameter of the magnetic core 5 is about 4 mm, and the depth of the coil-storing groove portion 5h is about 0.5 mm.

As described above, in the resolver 1 according to Example 2, the opening portion Hm . . . is provided between the radial wire portions Wm and Wm . . . of the coil pattern Pc . . . in the sheet coil Cx . . . The sheet bridge portions Cm . . . between the opening portions Hm . . . are accommodated in the sheet-storing groove portions 5h (6h) . . . provided on the core surfaces 5s (6s) . . . of the magnetic cores 5 (6) . . . . Thus, it is possible to reduce the overall thickness when the sheet coil Cx . . . is assembled to the magnetic core 5 . . . . As a result, the resolver 1 can be further miniaturized (micro-miniaturized), and reducing the magnetic leakage flux further improves the magnetic circuit characteristics. In addition, the resolver 1 can be further reduced in weight, and the positioning between the sheet coil Cx . . . and the magnetic core 5 . . . is facilitated, thus contributing to the ease of assembly (ease of manufacture).

Therefore, resolver 1 according to this embodiment (Examples 1 and 2) basically comprises sheet coils Cx, Cy, and Co formed in a ring shape forming excitation windings 2x and 2y and detection winding 3, and magnetic cores 5 and 6 attached to the sheet coils Cx, Cy, and Co, and coil portions Mf and Mr . . . of the same coil pattern Pc . . . formed in multi-pole form on the front and back surfaces of sheet coils Cx . . . forming at least one winding 2x (2y and 2o) of excitation windings 2x and 2y and detection windings 3. The electrical phase of one coil portion Mf . . . in each coils portion Mf and Mr . . . is different by 180 [°] from the electrical phase of the other coil portion Mr . . . , so that noise components due to excess magnetic flux including magnetic leakage flux and disturbance can be cancelled out by the generated magnetic flux in the opposite direction. As a result, it is possible to improve detection accuracy, stability, and reliability, while realizing miniaturization (micro-miniaturization) of resolver 1 ensuring a necessary inductance.

The preferred embodiments (Example 1 and Example 2) have been described in detail. However, the present invention is not limited to such embodiments (Examples) and can be modified, added to, or deleted as desired in terms of the detailed configuration, shape, material, quantity, numerical value, and others within the scope of the present invention.

For example, an example in which excitation signals Sx and Sy are amplitude-modulated by a high-frequency signal Sh, and modulation signals Smx and Smy obtained by inverting the polarity of the high-frequency signal Sh at the polarity inversion position of the excitation signals Sx and Sy are input to excitation windings 2x and 2y, and a detection signal So is obtained by demodulating the modulation signal Smo output from the detection winding 3 is shown. However, the example does not exclude a case in which the excitation signals Sx and Sy are input without modulation to excitation windings 2x and 2y and the displacement amount of the passive body 4 provided with the excitation windings 2x and 2y or the detection winding 3 is detected based on the detection signal So output from the detection winding 3. In addition, the example is shown in which the passive body 4 is configured as a rotating body 4r having a rotational shaft 11 and the sheet coils Cx, Cy, and Co, and the magnetic cores 5 and 6 are formed as a so-called rotary type in a ring shape coaxial with the rotational shaft 11. However, the example can also be applied to a so-called linear type in which the passive body 4 is displaced in the straight direction. Also, although the modulation signals Smx and Smy are shown as a case in which the excitation signals Sx and Sy are amplitude-modulated, but the adoption of other modulation methods such as phase modulation is not excluded. On the other hand, in the example, the main part configuration of the present invention is the provision of the coil portions Mf and Mr . . . by the same coil patterns Pc . . . constituted in the multipolar form on the front and back surfaces. The sheet coils Cx and Cy may be used as sheet coils to apply a configuration in which the electrical phase of one coil portion Mf . . . in each coil portion Mf and Mr . . . is different from the electrical phase of the other coil portion Mr . . . . However, the configuration may be applied to only one sheet coil Cx or Cy, to the sheet coil Co, to all sheet coils Cx, Cy, and Co, or to one or two sheet coils arbitrary selected. Each sheet coil Cx, Cy, and Co can be constituted by one sheet or multiple sheets. Further, in the coil pattern Pc . . . , it is desirable to set the width Lo and Li of the circumferential wire portions Wo . . . , Wi . . . to be larger than the width Lm of the radial wire portion Wm . . . . However, the case in which the widths are the same or the width Lo and Li of the circumferential wire portions Wo . . . and Wi . . . is smaller than the width Lm of the radial wire portion Wm . . . is not excluded.

INDUSTRIAL APPLICABILITY

The resolver according to the present invention can be used for various applications for detecting a displacement amount (rotation angle) of a passive body provided with an excitation winding or a detection winding.

The invention claimed is:

1. A resolver for detecting a displacement amount of a passive body provided with an excitation winding and a detection winding based on an excitation signal input to the excitation winding and a detection signal output from the detection winding, the resolver comprising:
a sheet coil formed in a ring shape constituting the excitation winding and the detection winding; and
a magnetic core attached to the sheet coil,
wherein a coil portion of a same coil pattern constituted by a multipole type is provided on front and back surfaces of the sheet coil constituting at least one winding of the excitation winding and the detection winding, and
wherein an electrical phase of the coil portion provided on the front surface of the sheet coil differs from an electrical phase of the coil portion provided on the back surface of the sheet coil by 180°.

2. The resolver according to claim 1, wherein the coil pattern is formed in a rectangular waveform along the circumferential direction by combining a wire portion in the circumferential direction (circumferential wire portion) and a wire portion in the radial direction (radial wire portion).

3. The resolver according to claim 2, wherein the coil pattern features the width of the circumferential wire portion set larger than the width of the radial wire portion.

4. The resolver according to claim 1, wherein the coil pattern features the sheet coil having an opening portion between the radial wire portions, and wherein a sheet bridge portion between the opening portions is accommodated in a sheet-storing groove portion provided on a core surface of the magnetic core.

5. The resolver according to claim 1, wherein the detection signal is obtained by modulating amplitude of the excitation signal by a high-frequency signal, inputting a modulation signal obtained by inverting a polarity of the high-frequency signal at a polarity inversion position of the excitation signal to the excitation winding, and demodulating the modulation signal output from the detection winding.

6. The resolver according to claim 1, wherein at least one of the sheet coils other than the sheet coil having the coil portions with different 180° phases in the sheet coil is provided with a magnetic flux correction function unit in which the electrical phase of one coil portion is different from the electrical phase of the other coil portion by an electrical angle ε° for canceling a harmonic component of magnetic flux distribution.

7. The resolver according to claim 2, wherein the coil pattern features the sheet coil having an opening portion between the radial wire portions, and wherein a sheet bridge portion between the opening portions is accommodated in a sheet-storing groove portion provided on a core surface of the magnetic core.

8. The resolver according to claim 3, wherein the coil pattern features the sheet coil having an opening portion between the radial wire portions, and wherein a sheet bridge portion between the opening portions is accommodated in a sheet-storing groove portion provided on a core surface of the magnetic core.

9. The resolver according to claim 2, wherein the detection signal is obtained by modulating amplitude of the excitation signal by a high-frequency signal, inputting a modulation signal obtained by inverting a polarity of the high-frequency signal at a polarity inversion position of the excitation signal to the excitation winding, and demodulating the modulation signal output from the detection winding.

10. The resolver according to claim 3, wherein the detection signal is obtained by modulating amplitude of the excitation signal by a high-frequency signal, inputting a modulation signal obtained by inverting a polarity of the high-frequency signal at a polarity inversion position of the excitation signal to the excitation winding, and demodulating the modulation signal output from the detection winding.

11. The resolver according to claim 4, wherein the detection signal is obtained by modulating amplitude of the excitation signal by a high-frequency signal, inputting a modulation signal obtained by inverting a polarity of the high-frequency signal at a polarity inversion position of the excitation signal to the excitation winding, and demodulating the modulation signal output from the detection winding.

12. The resolver according to claim 1, wherein the coil portions provided on the front and back surfaces of the sheet coil are configured in such a manner that a current flowing in a circumferential wire portion of the coil portion provided on the front surface of the sheet coil and a current flowing in a circumferential wire portion of the coil portion provided on the back surface of the sheet coil are in opposite directions.

* * * * *